United States Patent Office 3,311,266
Patented Mar. 28, 1967

3,311,266
LIQUID DISPENSING MEANS
Wallace W. Ward, 28 Long Hill Lane, Chatham
Township, Chatham, N.J. 07928
Filed Apr. 12, 1965, Ser. No. 447,173
15 Claims. (Cl. 222—146)

The instant invention relates to dispensing means and more particularly to a novel liquid dispensing means, preferably for dispensing heated liquids such as water and having apparatus for automatically dispensing a measured amount of liquid from a container regardless of the head of the container.

Presently, vending machines find widespread use especially in the field of automatically providing beverages for the user upon deposit of the appropriate coinage. Typical vending machines are coffee, soda and candy vending machines. In the case of coffee vending machines, a wide variety of selections are normally available for the user. Some of these selections are coffee black—no sugar; coffee black—one sugar; coffee black—two sugars; coffee cream—no sugar; coffee cream—one sugar; coffee cream—two sugars, et cetera. Vending machines of this type normally fall into the general categories. The first category consists of those vending machines which are employed in high yield or high return areas. High yield areas are defined as those which provide a usage of 500–600 cups daily per installation. The second general category is the marginal, or low yield area where a machine employed in such an area usually delivers 500 cups over as much as a one week period. In high yield areas it becomes economically feasible, due to the sufficient profit earned by the machine, to provide a maintenance man who may service the machine as often as once per day. In low yield, or marginal areas, the economics of the operation is such as to make the maintenance of a machine and replenishing of ingredients (i.e. cups, syrup, sugar etc.) on a once per day basis economically prohibitive. Thus, in order to service marginal areas it becomes necessary to provide a machine which is both low in manufacturing cost and has an extremely low maintenance cost in order to permit a marginal area to be serviced economically. In the case of a marginal area the installation of a machine in the normal fashion becomes economically prohibitive. As one example, in a high yield area it is normal to install a machine and provide such a machine with suitable drainage and a suitable water supply. This necessitates an additional plumbing cost over and above the cost of the vending machine itself. In marginal areas such additional plumbing costs are prohibitive.

It is therefore necessary to provide a vending machine for use in marginal areas which is effectively self-contained and which is of a design which is simple and yet effective enough as to permit vending machines for use in marginal areas to be manufactured as relatively low cost and to likewise be maintained at a low cost figure to enhance their economic feasibility.

The instant invention contemplates a liquid dispensing means which is self-contained and which is designed to accurately deliver a predetermined quantity of water each time it is so called upon to operate regardless of the liquid level or head within the container, which effective operation is due to its unique design.

The instant invention is comprised of suitable container means for housing a quantity of liquid, preferably water, which is sufficient to provide as many as 600 cups of coffee, for example. The container is provided with suitable electric heating means which is immersed within the container near the base or floor thereof and having a thermostatic control for continuously maintaining the liquid within the container at a temperature of approximately 130° F. Motor means mounted at the upper end of said container is provided for driving bell crank means, which bell crank means is coupled to suitable bellows means by a push rod for the purpose of expanding and contracting said bellows means in order to pump the predetermined amount of water to the beverage mixing station. The bellows means is preferably a bellows arrangement, having a truncated cone configuration and being completely sealed. The bellows means is positioned a spaced distance above the base of said liquid container. The underside of the bellows means is provided with suitable flap valve means operative to permit the ingress of water into the bellows interior during an expansion stroke thereof and further, operative to seal said bellows means during the contraction operation.

Suitable delivery tube means are provided which are secured at one point to the bellows means and which extend through the upward end of said container and project outwardly therefrom for delivering the liquid being pumped to the beverage mixing station. The delivery tube means is suitably connected to the interior of said bellows means in order to permit the passage of water therethrough.

The delivery hose is preferably of a length which is approximately double the height of said liquid container and is preferably coiled within said liquid container. The midpoint of said delivery tube means has connected thereto a float member which is designed to keep the midpoint of said delivery hose at the surface level of said liquid. This arrangement insures the fact that the amount of water contained within the delivery hose will always be the same regardless of the head or height of the liquid within the container at any given time. This is due to the fact that the float means keeps the midpoint of the coil delivery hose at the surface of the liquid regardless of the height which the liquid may assume at any given time. The portion of the delivery hose which is connected between said submerged bellows means and the float means is formed of a material having a specific gravity which is heavier than water such as, for example, a gum latex so as to insure the fact that this portion of the delivery hose will remain submerged in the liquid regardless of the level of the liquid. The remaining portion of the delivery hose is preferably formed of a material having a specific gravity lighter than water such as, for example, polypropylene, so as to assist the float means in keeping this portion of the coil delivery hose on or above the surface level of the liquid. This arrangement insures that the amount of liquid in the delivery hose will always be the same so as to guarantee the amount delivered to the beverage mixing station will always be the same and further, since water always seeks its own level, the arrangement of the instant invention insures that the water contained within the delivery hose will have a level or height which is no greater than the height of the water or liquid within the container regardless of the liquid level within said container.

In order to keep the operational cost of the liquid dispensing means at a minimum, the heating means previously mentioned, is designed to maintain a constant temperature level of the liquid within the container at approximately 130° F. This relatively low temperature while ambient temperature, is still substantially lower than the necessary temperature needed for the beverage to be dispensed. In order to accommodate for this discrepancy, novel heating means are provided near the outer end of the delivery hose means and is comprised of a coil high wattage heating element contained within a ceramic cylinder which is directly coupled with said delivery hose so as to cause the water being delivered to the beverage mixing station to pass over said coil means, to quench said coil means, and thereby to absorb the heat generated by said coil means on its way to the beverage mixing station. This booster heating means acts to boost the temperature of the heated water being delivered by 20°–30° in order to supply heated water at a sufficiently high temperature level as required in a coffee vending machine. The heating element of the booster heater means is connected in parallel with the liquid dispenser motor means and therefore is energized in parallel therewith. Thus, as soon as the motor means begins operation to pump the bellows means, the high wattage coil is immediately energized. Thus, the coil becomes red hot a sufficient time before the water is actually pumped through the delivery hose so as to insure a sufficient boost in the temperature level of the water delivered to the beverage mixing station.

After the water is pumped through the booster heating means to the beverage mixing station the motor means continues to cycle the bell crank means. Some of the water delivered to the booster heater means will reverse its flow so as to return to the delivery hose due to the expansion of the bellows means. In order to prevent this, check valve means are provided between said booster heater means and the output end of the delivery hose means, said check valve means is so designed as to be normally biased to seal an opening in a substantially T-shaped member during delivery of the heated water to the booster heater means. During the time in which the water attempts to return to the container, the check valve means opens, causing the passage of air therethrough and into the delivery hose so as to prevent any water which has already been delivered to the booster heater means from returning to the liquid container.

The above described arrangement thereby provides a completely self-contained liquid dispensing means capable of dispensing a heated liquid such as, for example, water in very accurately controlled amounts and at minimum operating expenditures. This is due to the fact that a thermostatically controlled heating means operates to maintain a continuous liquid temperature which, although above the ambient temperature level, is substantially below the desired delivery temperature level. Suitable booster heater means operates to boost the temperature level to the desired amount only during the period in which a coffee beverage is being prepared. The use of a coiled delivery hose means coupled with suitable float means maintains the liquid contained within the delivery hose means during periods of non-use, submerged below the surface level of the liquid. The check valve means acts to prevent the reverse flow of water from the booster heater means region to the liquid dispensing container.

Since the liquid dispensing means of the instant invention is designed to operate without the need for a drain to carry away any excess liquid, and since the tank which holds the liquid to be dispensed is designed to be periodically and not automatically refilled, it becomes important to provide means for preventing any excessive water flow. For this reason, a cam operated switch is provided to automatically shut off the liquid dispensing means at the completion of each cycle.

It is therefore one object of the instant invention to provide liquid dispensing means for use in automatic vending machines and the like, comprising novel means for accurately dispensing a predetermined amount of liquid to a beverage mixing station.

Another object of the instant invention is to provide liquid dispensing means for use in automatic vending machines and the like, comprising novel means for accurately dispensing a predetermined amount of liquid to a beverage mixing station wherein the liquid delivered reaches the beverage mixing station at a predetermined temperature level.

Another object of the instant invention is to provide novel liquid dispensing means for use in automatic vending machines and the like having novel coiled delivery hose means which is greater in length than the liquid dispensing means container for retaining the liquid contained within the delivery hose means submerged below the surface level of the liquid.

Still another object of the instant invention is to provide novel liquid dispensing means for use in automatic vending machines and the like having novel coiled delivery hose means which is greater in length than the liquid dispensing means container for retaining the resilient coil contained within the delivery hose means submerged below the surface level of the liquid and further comprising float means for aiding in retaining the liquid contained within the delivery hose means submerged below the surface level of the liquid within the dispenser means container.

Still another object of the instant invention is to provide novel liquid dispensing means for use in automatic vending machines and the like and comprising novel bellows means positioned within the container housing said liquid and having valve means for permitting the ingress of water through said valve means and preventing the egress of water through said valve means and during the expansion and contraction respectively, of said bellows means.

Another object of the instant invention is to provide novel liquid dispensing means for use in automatic vending machines and the like comprising first thermostatically controlled heater means for heating a liquid to a temperature level which is a predetermined amount above the ambient temperature level.

Another object of the instant invention is to provide novel liquid dispensing means for use in automatic vending machines and the like comprising first thermostatically controlled heater means for heating a liquid to a temperature level which is a predetermined amount above the ambient temperature level and comprising booster heater means substantially instantaneously raising the temperature level of the water to an amount substantially higher than said predetermined level only during a liquid dispensing operation.

Still another object of the instant invention is to provide novel liquid dispensing means for use in automatic vending machines and the like having novel coiled delivery hose means which is greater in length than the liquid dispensing means container for retaining the resilient coil contained within the delivery hose means submerged below the surfce level of the liquid and further comprising float means for aiding in retaining the liquid contained within the delivery hose means submerged below the surface level of the liquid within the dispenser means container and further comprising check valve means for permitting the flow of water from the delivery hose means to the beverage mixing station and for preventing the flow of water from the beverage mixing station toward said delivery hose means.

These, and other objects of the instant invention will become apparent when reading the accompanying description and drawings in which:

FIGURE 1a is a schematic diagram showing the electrical circuit used in operating the device of FIGURE 1;

Figure 1:
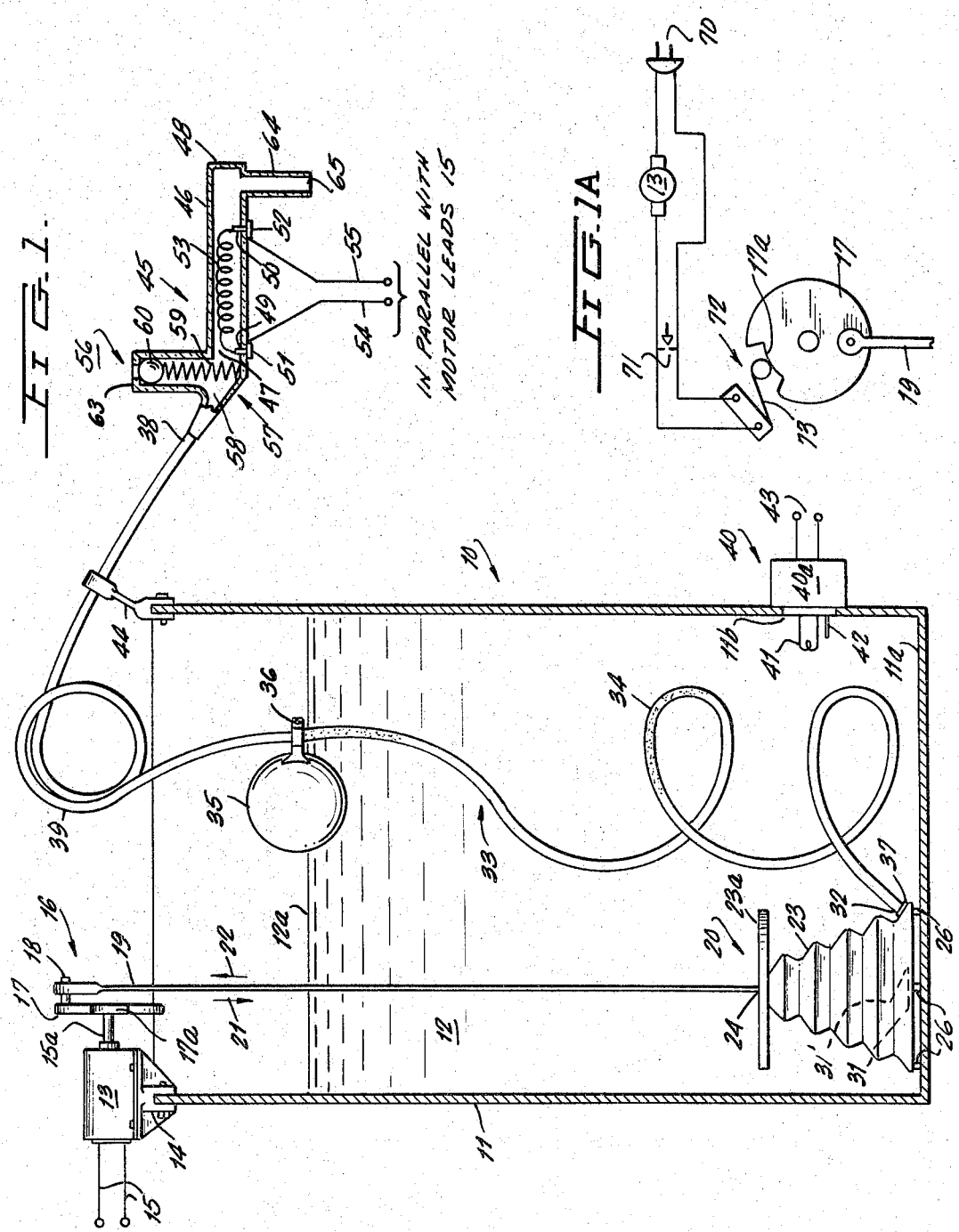
FIGURE 1 is a schematic diagram of a liquid dispenser means designed in accordance with the principles of the instant invention and showing components thereof in sectionalized form for simplifying the description thereof.

Referring now to the drawings, and more specifically to FIGURE 1, there is shown therein a liquid dispensing apparatus 10 which may be housed in any automatic vending machine and supported therein in any suitable manner. The liquid dispensing apparatus 10 is comprised of a container or tank 11 which may have a general cylindrical, rectangular, or square-shape or any other desired configuration, depending only upon the needs of the user, since the configuration thereof lends no novelty to the instant invention. The container 11 houses a liquid 12 which may preferably be water in the case of the use of the apparatus 10 in an automatic vending machine. A motor means 13 is secured by bracket means 14 near the upper end of tank 12 and is provided with input leads 15 which are electrically connected in any well known manner to a power source (not shown). Motor 13, upon energization thereof, is designed to rotatably drive a shaft 15 secured to a bell crank arrangement 16 comprised of a rotatably mounted disc 17 secured to shaft 15 and having a pin 18 projecting from one face thereof. The pin 18 is pivotally coupled to a push rod member 19, the opposite end of which is coupled to the bellows means 20. The operation of the bell crank means 16 is such that upon rotation thereof through a complete cycle, the push rod means 19 connected thereto experiences reciprocating motion in the direction of arrows 21 and 22.

The bellows means 20 is comprised of a truncated substantially conical-shaped bellows member 23 formed of a suitable plastic material or any other material which will not deteriorate when submerged in a heated liquid. The upper end thereof is coupled to push rod 19 at 24 so as to cause the bellows member 23 to expand and contract under control of the reciprocating movement of push rod 19. A disc-shaped member 23a is secured at the top of the bellows assembly 20 for the purpose of insuring that the folds in bellows 23 will fold inwardly and will not be inverted when the bellows assembly is collapsed under control of push rod 19.

Figures 2, 3:
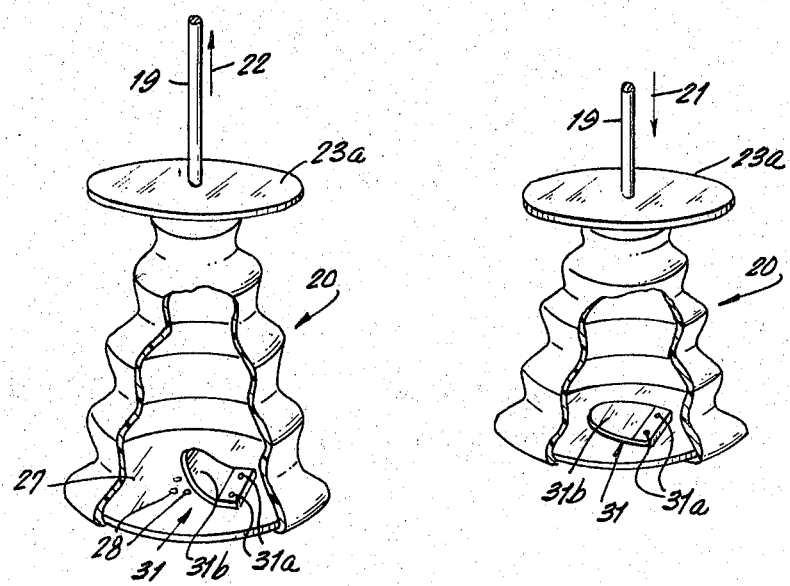
FIGURE 2 is a perspective view of the underside of the bellows means shown in FIGURE 1 with the flap thereof being in the open position.
FIGURE 3 is a perspective view of said bellows means showing the flap valve means being in the closed position.

Referring to FIGURES 2 and 3, as well as FIGURE 1, the underside of the bellows member 23 has secured thereto a disc-shaped member 27 such that the periphery of member 27 forms a continuous closed seam around the base of the truncated cone-shaped bellows member 23. A plurality of legs 26 are secured to the underside of disc member 27 and may further be secured to the floor 11a of container 11 so as to rigidly position the base of bellows member 23 a spaced distance above floor 11a.

Due to the nature of the liquid dispensing means of the instant invention, it is important that no excessive water be dispensed by the system and further, that the system be protected against the possibility of a stuck open valve. These disadvantageous features are overcome through the electrical circuit shown in FIGURE 1a. This circuit is comprised of a suitable plug 70 which may be plugged into a local power source for the purpose of energizing motor 13. Two switch assemblies 71 and 72 are connected in parallel to one another, with this parallel combination being connected in series with motor 13 and plug 70. Switch 71 is normally open and closes with the deposit of a coin into the vending machine. This completes the electrical circuit energizing motor 13. Switch 71 is preferably a slow-to-open switch. The energization of motor 13 causes rotation of shaft 15a and cam member 17 which is provided with a notch 17a. In the deenergized state, notch 17a cooperates with the arm 73 of a microswitch 72. The arm 73 is normally biased toward cam member 17. When the free end of arm 73 is positioned in notch 17a, microswitch 72 is in the open position. The energization of motor 13 causes shaft 15a and cam 17 to rotate, causing arm 73 to leave notch 17a and bear against the circular periphery of cam 17. This causes microswitch 72 to close. The closure of microswitch 72 occurs prior to the opening of slow-to-release switch 71, to provide continuity in the electrical circuit. Thus, by the time switch 71 opens, switch 72 has closed and the cam 17 will continue to rotate. As will be subsequently described, the rotation of cam 17 cases the reciprocal movement of push rod 19 for the performance of the liquid dispensing operation. Near the end of one full rotation of cam 17, arm 73 of switch 72 re-enters notch 17a, causing switch 72 to open. The opening of switch 72 interrupts the electrical circuit, deenergizing motor 13 and preventing the performance of a subsequent unwanted dispensing operation.

Figure 4:
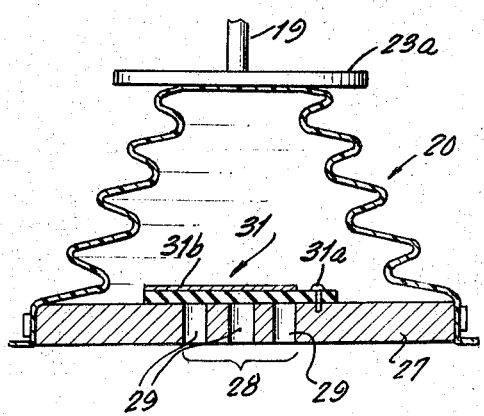
FIGURE 4 is a cross-sectional view of the bellows assembly shown in FIGURES 1, 2 and 3.

Referring now to FIGURE 4, a sectional view of the disc-shaped member 25 is shown therein and is comprised of a disc member 27 having a region 28 which may either be porous or which may be provided with a plurality of small apertures 29. A flap 31 is secured at one end thereof to disc 27 by suitable fastening means 31a. The flap 31 is preferably formed of a resilient material such as rubber, or a suitable plastic composition. A thin metallic sheet 31b having substantially the same configuration as flap 31 is secured atop flap 31. The thin metal sheet 31b acts as a stiffening means to insure closure of the flap assembly during the collapsing of the bellows assembly.

The operation of the flap valve is as follows:

During the portion of the rotating cycle of bell crank 16 during which the push rod 19 moves vertically upward in the direction shown by arrow 22, this causes the bellows means 20 to move to the fully expanded position. In so expanding, the increasing interior volume of the bellows member 23 substantially creates a vacuum condition causing the flap valve 31 to move to the position shown by the dotted line 31'. This causes the liquid in the immediate region of the underside of bellows means 20 to enter into the interior of bellows member 23 through the apertures 29 in the disc member 27. As the bell crank means 16 reaches its upper dead-center position and continues to rotate causing the push rod member 19 to move in the downward vertical direction, shown by arrow 21, this causes the bellows means 20 to move toward contraction or collapse, thereby causing flap valve 31' to move to the position shown by the dash line 31 thereby effectively sealing bellows means 20.

The liquid which is now captured within the bellows means 20 must therefore find another means of egress and does so by exiting through an opening 32 near the lower end of bellows member 23, which opening is directly coupled to the lower end of a coiled delivery hose 33.

The lower half 34 of coiled delivery hose 33 is formed of a material which is preferably heavier than water in order to insure the fact that this lower half will be submerged in the liquid 12. One material which the closed portion 34 may be formed of is gummed latex which has a specific gravity greater than that of water. It should be understood, however, that any other material may be substituted in the place of a gum latex hose.

A float means 35, designed to remain at the surface 12a of liquid 12, is suitably secured by a clamp means 36 to a point intermediate the ends 37 and 38 of the delivery hose 33. The total length of the delivery hose 34, including both its lower half 33 and its upper half 39, is substantially greater than the maximum height which the liquid may attain within the tank 11 and preferably the height of the delivery hose is double the height which the liquid may attain. For example, in one preferred embodiment, the maximum liquid level attainable was 40 inches and a coiled delivery hose of approximately 80 inches length was employed. The use of a coiled delivery hose which is substantially greater in overall length than the maximum height which the liquid level can attain in container 11 freely permits the float means 35 to be positioned at the surface level 12a of the liquid 12. Since the liquid will seek its own level, this arrangement assures the fact that any residual liquid within the delivery hose 33 will be contained within the lower half 34 of the delivery hose and hence will be submerged, thereby guaranteeing the fact that the liquid within hose 34, as well as the remaining liquid 12 in container 11, will be heated to the same temperature level.

The liquid 12 within container 11 is heated to a predetermined temperature level by heating means 40 which is comprised of a heating element 41 attached to the main body 40a thereof and inserted into the interior of container or tank 11 by means of a suitable opening 11b near the floor 11a thereof. Preferably heater means 40 is either secured to tank 11 by a suitable coupling (not shown) which rigidly positions the heater unit 40a and its heating coil 41 while at the same time preventing the escape of any liquid from the opening 11b. Heater means 40 is further provided with a thermostatic probe 42 or any other suitable means for the purpose of providing an indication of the liquid temperature level in order to provide thermostatic control of the heater means 40. The heater means is connected to a suitable power source by the leads 43 provided therefor. The heater means is continuously connected to the power source, but only operates to energize heating coil 41 when the thermostatic probe 42 indicates that the temperaure level of the water has dropped below a predetermined level. While thermostatic probe 42 is shown in close proximity to the heating element 41, it should be understood that these elements may be positioned a spaced distance away from one another greater than that shown in the figure in order that the thermostatic probe 42 may give a better indication of the general temperature level existing throughout the liquid 12. The thermostatic element is adjusted so as to maintain the liquid 12 in tank 11 at a constant temperature level of approximately 130° F.

Since a temperature level of approximately 130° F. is somewhat below the desired temperature level for a liquid such as water which may, for example, be employed in the preparation of a cup of coffee, additional booster heater means 45 shown in FIGURE 1 are provided for the purpose of increasing or boosting the temperature of liquid 12 which is delivered to the beverage mixing station to a level of approximately 155° F.–165° F. The booster heater means 45 is comprised of an elongated ceramic tube 46 having openings 47 and 48 at opposite ends thereof. The interior of ceramic tube 46 is provided with a coiled heater means and preferably a 1200 watt Nichrome element. The end terminals of the coiled heater element 53 extend through suitable openings 49 and 50 at opposite ends of ceramic tube 46 where they are secured by suitable conductive terminal screws 51 and 52. Also electrically secured to members 51 and 52 are suitable leads 54 and 55, respectively, which are connected in parallel with the terminal leads 15 of motor means 13. This parallel connection is provided in order to simultaneously energize heater element 53 with the energization of motor means 13.

The opening 48 of elongated ceramic tube 46 is connected to a ceramic elbow-shaped member 64, the opposite end of which is provided with an opening 65 for delivering the heated liquid to the beverage mixing station.

The beverage mixing station, while not shown, may preferably take the form of a substantially shallow mixing bowl arranged so as to have the ingredients such as, for example, the heated water, coffee, sugar and cream introduced near the top of the mixing bowl and substantially tangential to the upper end of the mixing bowl in order to have ingredients swirl around the mixing bowl in order to provide adequate admixing of the ingredients. The mixing bowl may further be provided with a centrally located opening which may, in turn, be connected to the cup into which the beverage is to be dispensed by means of a suitable delivery tube. Typical mixing bowl arrangements which may be employed in cooperation with the instant invention are described in copending applications Ser. Nos. 447,172 and 447,193 entitled Liquid Dispenser and Powdered Material Dispenser, respectively, filed Apr. 12, 1965, respectively and assigned to the assignee of the instant invention. While such mixing bowl arrangements constitute a preferred embodiment, it should be understood that other mixing arrangements may be employed since they lend no novelty to the instant invention. The booster heater means 45 of the instant invention operates in the following manner:

In the case of automatic vending machine operation, it is typical for the user to select the particular drink or beverage which he desires and then to deposit the appropriate coinage. Upon completion of these operations, a suitable control means (not shown) contained within the vending machine operates to selectively energize the leads 15 of motor means 13. Since the leads 54 and 55 of booster heater means 45 are connected in parallel with leads 15 the coiled heating element 53 becomes energized simultaneously therewith.

The energization of motor 13 activates bell crank means 16 in order to reciprocally operate push rod 19. The operation is such that push rod 19 first moves vertically upward to move bellows member 23 to the fully expanded position. This causes the liquid 12 in the immediate region of bellows member 23 to enter into the interior of bellows member 23 through flap valve means 31 in the same manner as previously described.

Upon completion of the upward vertical stroke, bell crank means 16 operates to initiate the downward vertical stroke of push rod 19 causing bellows member 23 to move to the contracted or collapsed position. With the flap valve means 31 being closed during this operation, the water which is at a temperature level of approximately 130° F.–140° F. is urged out of the bellows member 23 through the delivery hose 33. The heated water travels upward through the delivery hose 33 and subsequently enters the interior of ceramic tube 46. The water makes physical contact with the coiled heating element 53 which by this time is in a fully heated state. The water, in quenching coil 53, absorbs the heat generated by the coil causing the water to substantially instantaneously increase its temperature level by approximately 20° F.–30° F. Thus, by the time the water exits through the opening 48 in ceramic tube 46 the water has reached a temperature level suitable for use in the preparation of a coffee drink. The all-over temperature level lies in the range from 150° F.–180° F. This temperature level has been selected to minimize evaporation of the liquid since the tank 11 is periodically and not automatically replenished with liquid. The heated water exits through the ceramic elbow tube 64 and enters into the beverage mixing station previously described.

The electronic cycling means (not shown) provided in the vending machine automatically deenergizes heating coil element 53 upon completion of the delivery cycle of the apparatus 10 of FIGURE 1. The completion of the delivery cycle occurs when the bell crank means 16 reaches the position shown in FIGURE 1, thus placing the bellows means 20 in the position of FIGURE 1. The arrangement of separate heating means, namely, the thermostatically controlled heating means 40 of the booster heating means 45 constitutes a substantial savings in the operating costs of the apparatus 10. Since the thermostatically controlled heating means 40 operates to maintain the temperature level of the order of 130° F. the cost for power supply to the heating means 40 necessary to maintain this temperature level is substantially less than the cost necessary to maintain a temperature level of 160° F., for example. Since the apparatus 10 of the instant invention is preferably designed for use in vending machines to be installed in marginal areas the apparatus may experience substantially long periods of idleness thereby making it economically unfeasible to maintain a continuous heating level of 160° F., for example. The necessary temperature level is achieved by the intermittent operation of booster heating means 45 which becomes energized only during the period in which a beverage is being prepared thus providing heated water at a temperature level necessary for preparing a coffee drink and thereby allowing the thermostatically controlled heating means 40 to operate at a substantially lower controlled temperature level. The heating means 40 and 56 thereby cooperate to provide heated water at substantially lower costs than would be encountered by the provision of a single thermostatically controlled heating means which would of necessity be required to maintain a temperature level of approximately 160° F.

As was previously described the bell crank means 16 upon completion of a full cycle returns the bellows member 23 to the position shown in FIGURE 1. This operation thereby causes the bellows means to return to its fully expanded position which means that water within tank 11 will enter through flap valve means 31 due to the vacuum created in the interior of bellows member 23 and simultaneously therewith water which may have entered into the region of ceramic tube 46 will be drawn back into the upper portion 39 of coiled delivery hose 33. In order to minimize the amount of water which re-enters delivery hose portion 39 a check valve means 56 is provided.

Check valve means 56 is comprised of a substantially T-shaped ceramic element 57 and having a straight-through portion with openings 58 and 59 communicating with the openings 38 and 47 in delivery hose 39 and elongated ceramic tube 46 respectively. The transverse arm of T-shaped ceramic member 56 is provided with an opening at its free end thereof having a continuous flange 63 along its marginal edge. The interior of the transverse arm houses a spring bias member 61 having an upper end thereof secured to the interior wall of the transverse arm at 62 and having a lower end thereof bearing against a check valve ball 60. As can be seen in FIGURE 1, spring means 61 normally biases the ball member 60 so as to seal the opening 66 in the transverse arm. The operation of the check valve means 56 is as follows:

During the delivery portion of the cycle the heated water exits through the upper portion 39 of delivery hose 33 causing the water to enter both elongated ceramic tube 46 and into the transverse arm. The water bears against the check valve ball member 60 only acting to further seal the opening 66 therein thus substantially all the water enters into the booster heater means 45.

During the portion of the cycle in which bellows member 23 is returned to its fully expanded state vacuum created in the interior thereof causes any water in the region of the booster heater means 45 to reverse its flow and re-enter the upper portion 39 of delivery hose 33. This creates a vacuum condition in the transverse arm of T-shaped member 57 causing ball member 60 to move away from and hence unseal opening 66 thus causing air to enter the transverse arm and hence be drawn into the upper portion 39 of delivery hose 33 thereby minimizing the amount of water which will return to the delivery hose. Such operation is desirable in order to insure the fact that any water contained within the delivery hose 33 will remain submerged beneath the surface level of the liquid 12. Since the lower half 34 of delivery hose 33 is at least as long and preferably longer than the mixing height of tank 11, the float means 35 insures the fact that the lower portion 34 of the delivery hose will always remain submerged in tank 11 and therefore any water contained within the lower half 34 of the delivery hose will be heated to the same temperature level as the water exterior to hose portion 34. Since the amount of water contained within the delivery hose 33 remains substantially constant and since the bellows means 20 is operated in substantially the same manner for each delivery operation the amount of water to be delivered to the beverage mixing station will remain substantially uniform throughout the operation of the apparatus 10 completely independent of the liquid level in tank 11. It should be understood that the stroke of bell crank means 16 is sufficient to deliver an amount of water equal to the sum of water contained within the delivery hose 33 and the amount of water necessary for a single cup of coffee.

It can therefore be seen that the instant invention provides a novel liquid dispensing apparatus which is so designed as to provide an accurately controlled amount of water for use in mixing a coffee drink each time it is called upon to operate and completely independent of the liquid level in the dispensing means tank. The apparatus is also designed to be completely self-contained so as to require no plumbing installation costs whatsoever in order to keep the machine installation and operating costs at a minimum. By selection of an appropriate size tank the liquid dispensing means may capably deliver as many as 500–600 cups of coffee and can be dependent upon to operate over long periods of time without any attendance whatsoever. The provision of thermostatically controlled heating means in cooperation with booster heater means provides heated water at a desired temperature level while at the same time minimizing operating expenses for the apparatus.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means having a portion thereof submerged in said liquid; said submerged portion being substantially longer than the maximum height attainable by the liquid in said container means; float means secured to a point near the upper end of said delivery hose means submerged portion to retain the liquid within said delivery hose means submerged portion in the liquid contained in said container means.

2. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; said delivery hose means comprised of a first and second hose portions; said first hose portion having a first end connected to said pump means and a second end connected to said float means; said first hose portion being formed of a flexible coiled material having a specific gravity greater than the specific gravity of water.

3. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; said delivery hose second portion being connected to said first hose portion second end and a beverage mixing station; said second hose portion being formed of a material having a specific gravity less than the specific gravity of water.

4. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means.

5. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level.

6. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink.

7. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink; said predetermined temperature level being within the range of 130° F.–140° F.

8. The apparatus of claim 1 further comprising booster heater means for substantially instantaneously raising the temperature level of said liquid comprising a substantially cylindrical tube of non-conductive material coupled to said delivery hose; a coiled heater element positioned within said tube for heating a liquid passing through said tube upon energization of said heater element; first and second terminals at opposite ends of said tube for securing the first and second ends of said heater element to said tube and for connecting a power source thereto, said first and second terminals being connected in parallel with said pump means to be energized only upon energization of said pump means.

9. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink; booster heater means connected to said delivery hose means for substantially instantaneously heating the liquid passing through said delivery hose means prior to the passage of the liquid at the beverage mixing station.

10. Liquid dispensing means for use in automatic vending machines said means comprising container means for housing a liquid; pump means postioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink; booster heater means connected to said delivery hose means for substantially instantaneously heating the liquid passing through said delivery hose means prior to the passage of the liquid at the beverage mixing station; said booster heater means being electrically connected in parallel with said pump means and being energized only upon energization of said pump means.

11. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; booster heater means for substantially instantaneously raising the temperature level of the liquid comprising a substantially cylindrical tube for non-conductive material; a coiled heater element positioned within said tube for heating a liquid passing through said tube upon energization of said heater element; first and second terminals at opposite ends of said tube for securing the first and second ends of said heater element to said tube and for connecting a power source thereto.

12. Liquid dispensing means for use in automatic vending machines said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; booster heater means for substantially instantaneously raising the temperature level of the liquid comprising a substantially cylindrical tube for non-conductive material; a coiled heater element positioned within said tube for heating a liquid passing through said tube upon energization of said heater element; first and second terminals at opposite ends of said tube for securing the first and second ends of said heater element to said tube and for connecting a power source thereto; said booster heater means being electrically connected in parallel with said pump means and being energized only upon energization of said pump means.

13. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink; booster heater means connected to said delivery hose means for substantially instantaneously heating the liquid passing through said delivery hose means prior to the passage of the liquid at the beverage mixing station; check valve means connected between said booster heater means and said delivery hose means and having biased valve ball means for permitting flow of a liquid from said delivery hose means to said booster heater means and for preventing the flow of a liquid from said booster heater means to said delivery hose means.

14. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; first heater means having heater element means positioned within said container means near the floor thereof for heating the liquid contents of said container means; said first heater means further comprising a thermostatic control means for maintaining said liquid contents at a predetermined temperature level; said predetermined temperature level being substantially lower than the desired temperature level of a coffee drink; booster heater means connected to said delivery hose means for substantially instantaneously heating the liquid passing through said delivery hose means prior to the passage of the liquid at the beverage mixing station; check valve means connected between said booster heater means and said delivery hose means and having biased valve ball means for permitting flow of a liquid from said delivery hose means to said booster heater means and for preventing the flow of a liquid from said booster heater means to said delivery hose means; said check valve means comprising a hollow T-shaped ceramic member having the straight-through portion of said T-shaped member connected between said delivery hose means and said booster heater means; the transverse portion of said T-shaped member having a flange at its open end; valve ball means within said transverse portion seated upon said flange; spring bias means secured to the interior of said transverse portion for urging said ball valve means against said flange.

15. Liquid dispensing means for use in automatic vending machines, said means comprising container means for housing a liquid; pump means positioned within said container; delivery hose means connected between said pump means and a beverage mixing station located exterior of said container; said pump means comprising means for pumping liquid through said delivery hose means to the beverage mixing station; said delivery hose means being substantially longer than the maximum height attainable by the liquid in said container means; float means secured to a point intermediate the ends of said delivery hose means to retain the liquid within said delivery hose means submerged in the liquid contained in said container means; switch means coupled to said pump means for limiting the operation of said liquid dispensing means to one cycle of operation.

References Cited by the Examiner

UNITED STATES PATENTS

| | | | |
|---|---|---|---|
| 1,625,892 | 4/1927 | Hollander | 103—87 |
| 1,938,719 | 12/1933 | Quimby | 103—87 |
| 2,529,672 | 11/1950 | Black | 219—307 X |
| 2,972,434 | 2/1961 | James | 219—307 |

FOREIGN PATENTS 161,709    3/1955    Australia.

ROBERT B. REEVES, *Primary Examiner.*

HADD S. LANE, *Examiner.*